(12) United States Patent
Kitahori et al.

(10) Patent No.: US 6,486,578 B2
(45) Date of Patent: Nov. 26, 2002

(54) SPINDLE MOTOR AND DISK UNIT

(75) Inventors: Hiroki Kitahori, Fujisawa (JP); David W. Albrecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/730,258

(22) Filed: Dec. 5, 2000

(65) Prior Publication Data

US 2001/0040411 A1 Nov. 15, 2001

(30) Foreign Application Priority Data

Apr. 7, 1999 (JP) .................................. PCT/JP99/01862

(51) Int. Cl.$^7$ .............................................. H02K 21/12
(52) U.S. Cl. .......................... 310/67 R; 310/85; 310/91
(58) Field of Search .......................... 310/67 R, 88–89, 310/91, 42, 51, 85–86; 360/99.08, 99.04, 98.07, 99.12, 98.08; 29/596–598

(56) References Cited

U.S. PATENT DOCUMENTS

| 5,304,878 | A | | 4/1994 | Oda et al. |
|---|---|---|---|---|
| 5,352,947 | A | * | 10/1994 | MacLeod .................. 310/67 R |
| 6,084,323 | A | * | 7/2000 | Pelstring et al. .......... 310/67 R |
| 6,316,853 | B1 | * | 11/2001 | MacLeod .................. 310/67 R |

\* cited by examiner

*Primary Examiner*—Tran Nguyen
(74) *Attorney, Agent, or Firm*—Robert B. Martin; Bracewell & Patterson, L.L.P.

(57) ABSTRACT

A spindle motor employed for a hard disk unit, including a hub having an outer peripheral wall portion provided with a rotor magnet on its outer peripheral surface and formed so as to be able to support the inner peripheral portion of a hard disk and a stator coil fixed so as to be positioned outwards in the radial direction of the disk and face the rotor magnet. This spindle motor is assembled in the disk unit, in which each stator coil is disposed so that the tracing of the magnetic head in movement is positioned between adjacent cores, thereby the magnetic head is affected less by the leak magnetic flux from the stator coil. In addition, the scanning head is moved to its unloading position with use of an energy accumulated in the capacitor when the power of the disk unit is turned off.

5 Claims, 9 Drawing Sheets

| MEASURING POINT | R1 = 6.0 | 6.5 | 7.0 | 7.5 | 8.0 | R2 = 9.0 (mm) |
|---|---|---|---|---|---|---|
| CORE CENTER | 34 | 24.5 | 14.0 | 8.2 | 6.4 | 2.8 |
| BETWEEN CORES | 31 | 25 | 12.5 | 6.8 | 3.1 | 1.8 |

(GAUSS)

SPINDLE MOTOR AND DISK UNIT

BACKGROUND OF THE INVENTION

1. Technical Field

The present invention relates to a motor and a disk unit, more particularly to an inner rotor spindle motor preferred for a super-compact hard disk unit and a disk unit that employs this spindle motor.

2. Description of the Related Art

As hard disk units are getting smaller and smaller in size, it has also been required that their driving systems are reduced in size while their driving powers, as well as their strength and safety, and other properties are improved more and more.

FIG. 11 is a cross sectional view of a configuration of a spindle motor 1 of a conventional 2.5-inch hard disk unit realized to meet such the requirements. A base 2 covering the bottom portion of the spindle motor 1 entirely is formed so that its bottom portion 15 formed under a recording surface of a disk 3 and in parallel to the recording surface and a cylindrical strut portion 4 for holding a hub 5 are unitarily formed.

In a center recessed portion 4a formed so as to be surrounded by the strut portion 4 is press-fit a center shaft 6 of the hub 5 with a bearing 7 therebetween, thereby the hub 5 is rotationally held there. The hub 5, while its outer peripheral wall portion 8 is fit in a center hole 3a of each disk 3, holds three disks 3 via a supporting member 16 respectively.

On the outer peripheral surface of the strut portion 4 are disposed at equal pitches cores 17 and the predetermined number of stator coils 9 wound on the cores 17. In the inner peripheral surface of the peripheral wall 8 of the hub 5 are disposed fixedly the predetermined number of rotor magnets 10 at equal pitches. The rotor magnets 10, located closely to the stator coils 9, face the stator coils 9 respectively.

Numeral 11 denotes a disk holding spring. The spring 11 is fixed to the hub 5 by a flange 12a of a stopper screw 12 engaged with a female screw 6a formed in the center shaft 6 of the hub 5. The outer peripheral portion 13 of the disk holding spring 11 is bent towards the disk surface so as to press the extreme inner peripheral portion of each disk 3. The three disks 3 are thus held between the flange 14 formed at the lower end of the outer peripheral wall portion 8 of the hub 5 and the disk holding spring 11, so that those disks 3 are rotated unitarily with the hub 5.

According to the above mentioned configuration, all the magnetic circuits (bearings 7, cores 17, stator coils 9, and rotor magnets 10) of the spindle motor 1 are all disposed in a space generated by the outer diameter of the hub 5 substantially equal to the diameter of the center hole 3a of the disk 3 and the height of the hub 5, which is decided appropriately to hold the three disks.

Furthermore, according to the above described configuration, an outer rotor spindle motor is formed so that a stator is composed of stator coils 9 and cores 17 and a rotor is composed of the hub 5 and the rotor magnets 10, and rotor magnets are disposed outside the stator coils. And, the outer peripheral wall portion of the rotor is located inside the inner peripheral portion of the disk and the inner peripheral portion of the disk is in contact with the outer surface of the outer peripheral wall portion of the rotor.

However, if such a hard disk unit is further reduced in size so that, for example, the outer diameter is decided approximately to be 42.08 mm in height, 36.4 mm in width, and 5 mm in thickness while the configuration shown in FIG. 11 remains the same, there will arise various problems.

Concretely, when the outer diameter of the hard disk unit is reduced, the outer diameter of each disk must also be reduced. And, in order to assure a required storage capacity, that is, a certain area of the storage portion of the disk, the inner diameter of the disk must further be reduced. On the other hand, the outer diameter of the rotor cannot be reduced so much. If the outer diameter of the rotor is reduced, it is impossible to house the stator coils and the bearings in a space inside the rotor. Consequently, if the outer peripheral wall portion of the rotor is positioned inside the inner peripheral portion of the disk, the hard disk unit cannot be reduced in size satisfactorily as described above. Under such circumstances, a spindle motor constructed in accordance with the present, invention, as shown in FIG. 10, is not publicly known, and therefore is not the prior art. In this configuration, the inner peripheral portion of each disk is positioned inside the outer peripheral wall portion of the rotor. In addition, both rotor and stator are extended to a portion under the disk.

Concretely, the strut portion 51 for holding the hub 52 is formed unitarily with the base 70 in FIG. 10. The center shaft 53 of the hub 52 is press-fit in the center hole 71 formed by this strut portion 51 with a bearing 54 therebetween. Consequently, the base 70 comes to hold the hub 52 rotationally.

Furthermore, the hub 52 is provided with a center portion 56 formed so as to cover the tip of the strut portion 51 and used to place a disk 26 thereon; a planar portion 57 extended outwards in the radial direction of the disk from this center portion 56; and an outer peripheral wall portion 58 extended into the lower portion of this planar portion 57 from the outer peripheral portion. On the outer peripheral surface of the strut portion 51 are disposed the predetermined number of stator coils 60 at equal pitches. Each stator coil is wound on a core 68. On the inner peripheral coil is wound on a core 68. On the-inner peripheral surface of the outer peripheral wall portion 58 of the hub 52 are disposed the predetermined number of rotor magnets 61 at equal pitches so as to face the inner peripheral surface closely thereto.

The holding spring 62 of the disk 26 is fixed to the hub 52 by a stopper screw 64 engaged with a female screw formed in the center shaft 53 of the hub 52. At this time, the extreme outer peripheral portion 63 of the holding spring 62 is bent towards the disk surface so as to press the extreme inner peripheral portion of the disk 26. The disk 26 is thus held between the center portion 56 of the hub 52 and the holding spring 62 and rotated unitarily with the hub 52.

At the bottom of the base 70 are formed a through-hole 65 used to pull out a lead wire. 66 and a groove used to guide the lead wire 66 to external, so as to prevent the lead wire 66 from protruding from the bottom. The lead wire 66 is connected electrically to a stator coil.

The outer rotor super-compact spindle motor composed as shown in FIG. 10, however, has been confronted with various problems to be described below.

1. The thickness of the planar portion 57 of the hub 52 is limited within about 0.3 mm, so that it is difficult to form the planar portion 57.
2. The thin planar portion 57 has a large area, so that large surface vibration occurs when the hub 52 rotates.
3. Because rotor magnets are disposed outside the thin planar portion 57, the hub 52 is weak in shock.
4. It is impossible to increase the thickness of the wall of the strut portion 51 of the base for holding the bearings, the rotor section (the hub 52 and the rotor magnets 61), the disk 26, etc., so that the rigidity of the strut portion is not enough.

5. An arm for holding a head moves between the hub and the disk that rotate together. And, a clearance cannot be secured substantially enough between the hub and the disk due to the surface vibration of the hub.
6. Because the lead wire 66 is pulled out from under the base, a groove as described above must be formed unavoidably, so that the strength of the base is lowered.
7. Because the magnetic circuit extends closely under the recording surface of the disk, the planar portion 57 of the hub 52 is also used as a shielding member, thereby the shielding member cannot be formed enough in thickness and its employable material is limited. The shielding effect of the planar portion 57 is thus not enough.

Under such circumstances, it is an object of the present invention to provide a spindle motor that can be reduced in size to an extent described above.

SUMMARY OF THE INVENTION

In order to achieve the above object, the spindle motor of the present invention comprises a base member, a hub, a rotor magnet section, and a plurality of coils. The base member is composed of a bottom portion, a substantially cylindrical strut portion extended upwards from the bottom portion so as to form a column-like supporting space inside, and a substantially cylindrical peripheral wall formed so as to share the same shaft with the strut portion so that the base member forms a circular recessed portion with the peripheral wall and the bottom portion. The hub is composed of a center shaft fit in the supporting space and supported there rotationally, a joint portion extended outwards in the radial direction of the disk from the center shaft at a position higher than the top end of the strut portion, an outer peripheral wall portion connected to the joint portion and formed so as to cover the strut portion, and a supporting portion extended outwards in the radial direction of the disk from the outer peripheral wall portion so as to be able to support a hard disk. The rotor magnet section has a plurality of magnetic poles positioned lower than the supporting portion and disposed on the outer peripheral surface of the outer peripheral wall portion so that an N-pole and an S-pole are alternated along the outer peripheral surface. A plurality of coils are wound on a plurality of protruded cores extended towards the rotary shaft from the inner peripheral surface of the circular recessed portion so that their tips come close to the rotor magnet section.

It is another object of the present invention to provide a disk unit, which comprises a spindle motor and a magnetic head. The spindle motor, as described above, is composed of a rotor magnet section including a hub having a supporting portion held rotationally at the base member so as to be able to support a disk and a plurality of magnetic poles disposed so that an N-pole and an S-pole are alternated in the circumferential direction around the rotary shaft. The rotor magnet section is disposed at the hub. The spindle motor also includes a plurality of coils wound on a plurality of protruded cores disposed fixedly to the base member and extended towards the center of the rotary shaft so that their tips come closely to the rotor magnet section. The magnetic head is movable substantially in the radial direction of the disk so as to scan a recording surface of the disk placed on a disk mounting section. And, the disk unit is composed so that the tracing of the magnetic head in movement is positioned between adjacent protruded cores.

It is further another object of the present invention to provide a disk unit, which comprises a spindle motor, a scanning head, a capacitor, and power off detecting means. The spindle motor, as described above, is composed of a rotor magnet section including a hub having a supporting portion held rotationally at a base member so as to be able to support a disk and a plurality of magnetic poles disposed so that an N-pole and an S-pole are alternated in the circumferential direction around a rotary shaft. The rotor magnet section is disposed at the hub. The spindle motor also includes a plurality of coils wound on a plurality of protruded cores disposed fixedly to the base member and extended towards the center of the rotary shaft so that their tips come closely to the rotor magnet section. The scanning head is held movably by moving means substantially in the radial direction of the disk so as to scan a recording surface of the disk. The capacitor accumulates an electrical energy when the disk unit is powered. The power off detecting means detects a power off of the power of the disk unit. And, the disk unit is composed so that the electrical energy of the capacitor is supplied to the moving means according to a power off detected by the power off detecting means, thereby the scanning head is moved to a predetermined unloading position.

DETAILED DESCRIPTION OF THE PREFERRED EMBODIMENT

Figure 1:
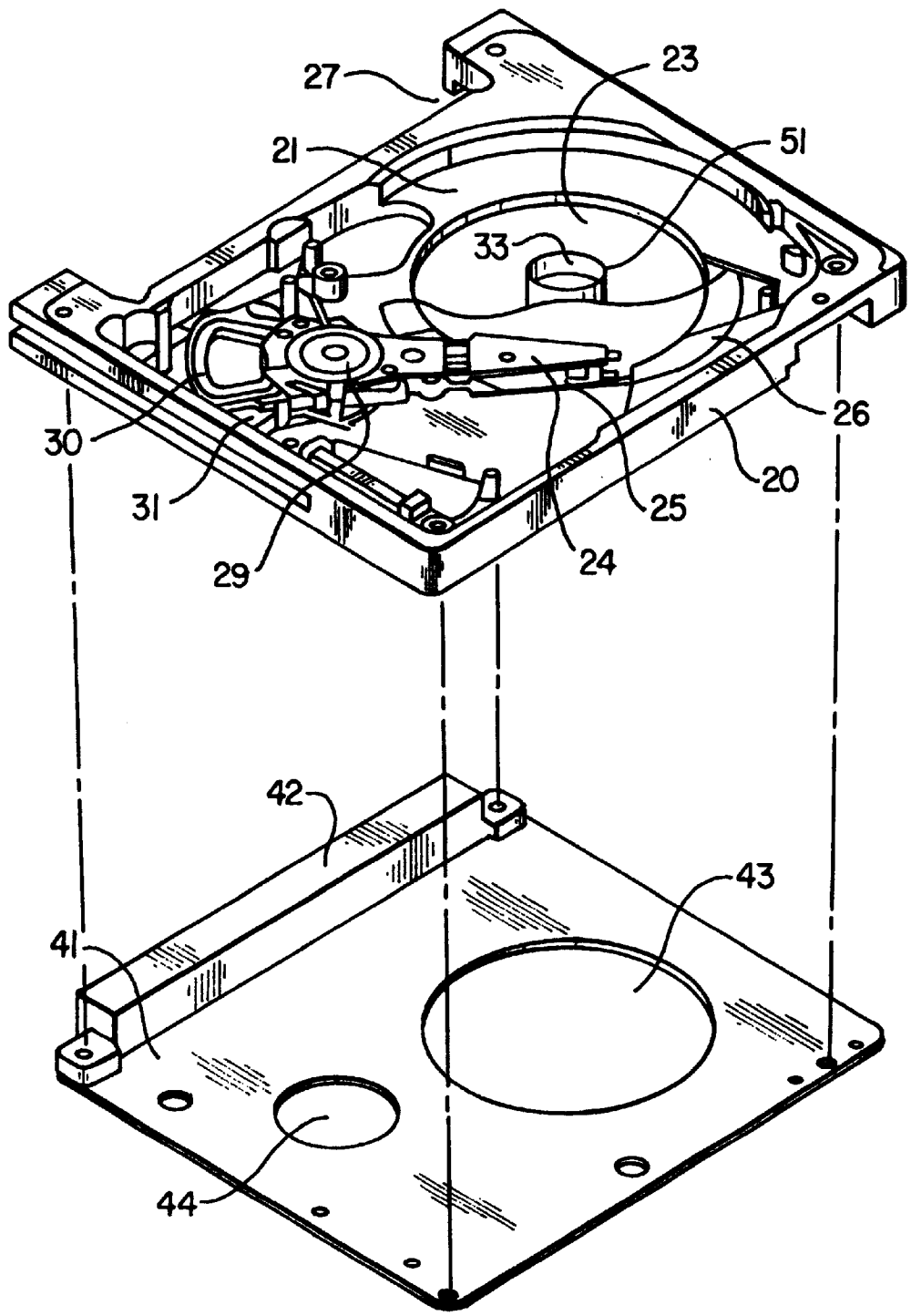
FIG. 1 is an exploded view of the major portion of a hard disk unit in which a spindle motor of the present invention is installed, in which the top side of the hard disk unit comes upwards.
Figure 2:
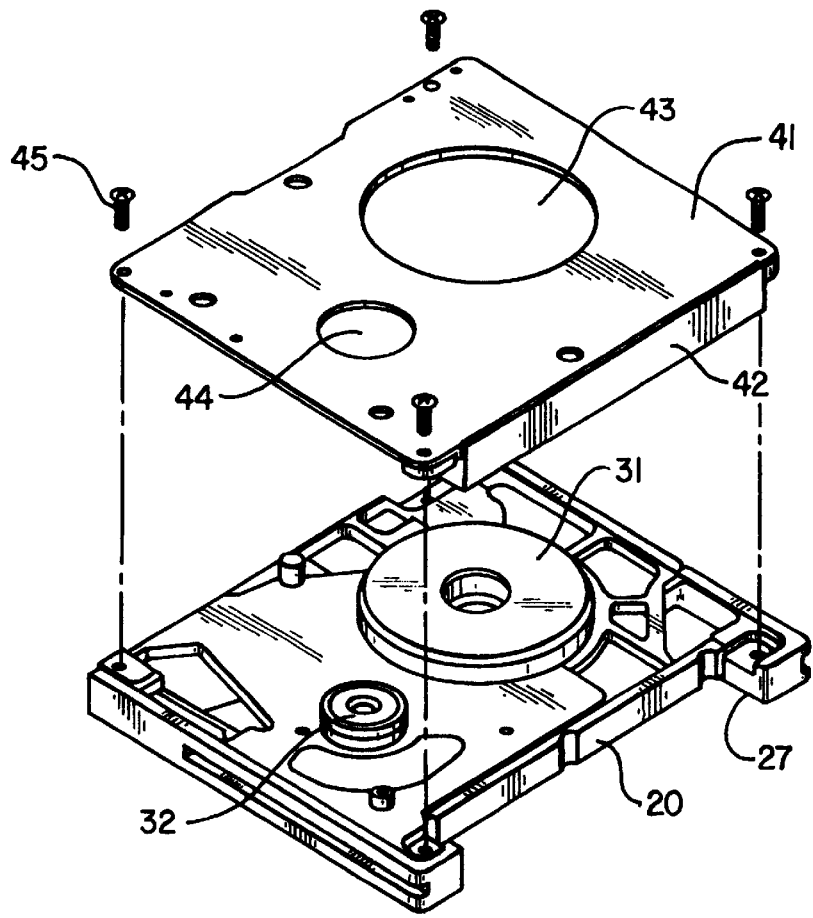
FIG. 2 is an exploded view of the major portion of the hard disk unit in which the spindle motor of the present invention is installed, in which the bottom side of the hard disk unit comes upwards.

FIGS. 1 and 2 are exploded views of the major portion of a hard disk unit in which a spindle motor of the present invention is installed. In FIG. 1, the top side of the hard disk unit is shown in the upper portion and in FIG. 2, the bottom side of the unit is shown in the upper portion.

At a base 20 functioning as the frame of the hard disk unit are formed a disk holding recessed portion 21 substantially in the entire top surface and a circular recessed portion 23 in which magnetic circuits of the spindle motor are held. At the center of this circular recessed portion 23 is formed a strut portion 51 protruded upwards. This strut portion 51 holds a hub (to be described later) of the spindle motor.

At one side of the base 20 is formed a notch portion 27 for accepting a connector (to be described later).

Actuator arms 24 and 25, which are used to hold a pair of magnetic heads for scanning both recording surfaces of a disk 26 (only part of the external appearance is shown in FIG. 1) supported by the hub (to be described later) and rotated unitarily with the hub. The actuator arms 24 and 25 are rotated unitarily with the pair of magnetic heads. The actuator arms 24 and 25 are driven by a voice coil motor composed of a magnet 31 supported rotationally by a supporting structure 29 and disposed fixedly at the base 20 and a coil 30 rotated unitarily with each of the actuator arms 24 and 25. An actuator is composed of these actuator arms 24 and 25, as well as a voice coil motor.

At the bottom of the base 20 shown in FIG. 2 exist a circular projection 31 formed at the other side of the circular recessed portion 23 and a bottom portion 32 formed at the other side of a supporting recessed portion (to be described later) for supporting the supporting structure 29 so that both of the circular projection 31 and the bottom portion 32 are protruded slightly from the bottom of the base 20.

A card 41 is used to mount necessary electronic parts for enabling the hard disk unit to function. The card 41 is provided with a connector 42 at its one side. The connector 42 is connected electrically with an external device.

At the card 41 are formed fitting holes 43 and 44 so as to face the circular projection 31 and the bottom portion 32 respectively. The card 41 is fixed to the bottom of the base 20 with screws 45. The connector 42 is fit in the notch portion 27 of the base 20 at this time.

Figure 3:
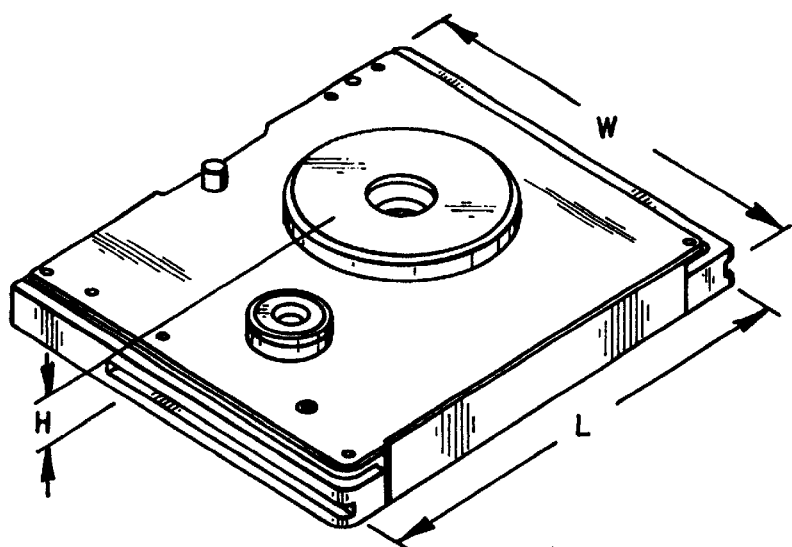
FIG. 3 is a perspective view of the hard disk unit assembled again from the view shown in FIG. 2.

FIG. 3 shows how the card 41 is attached to the bottom of the base 20. The external size of the card 41 in this state is L=42.08 mm, W=36.4 mm, and H=5 mm.

Figure 4:
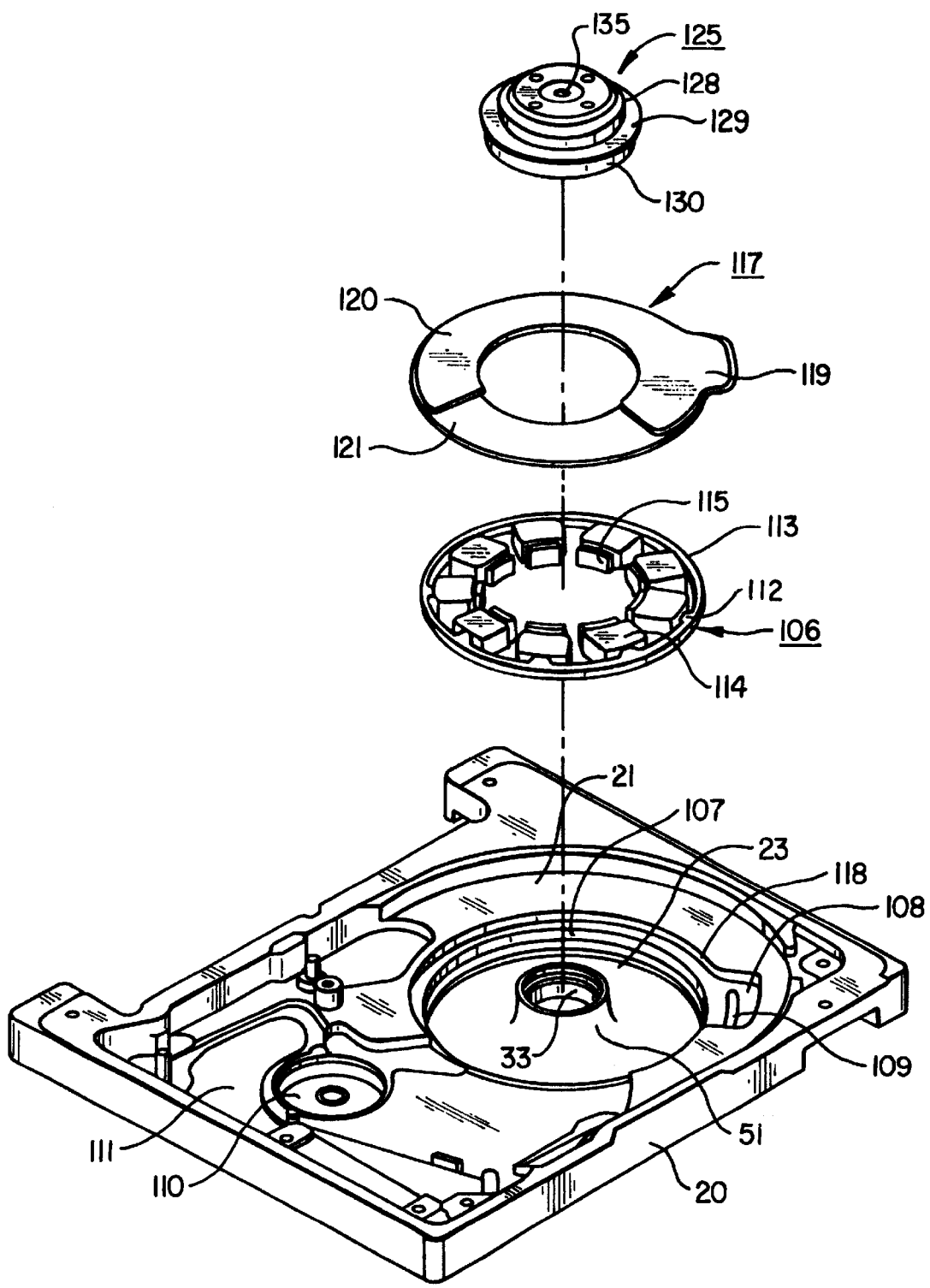
FIG. 4 is an exploded perspective view of the major portion of a disk unit in an embodiment of the present invention.
Figure 5:
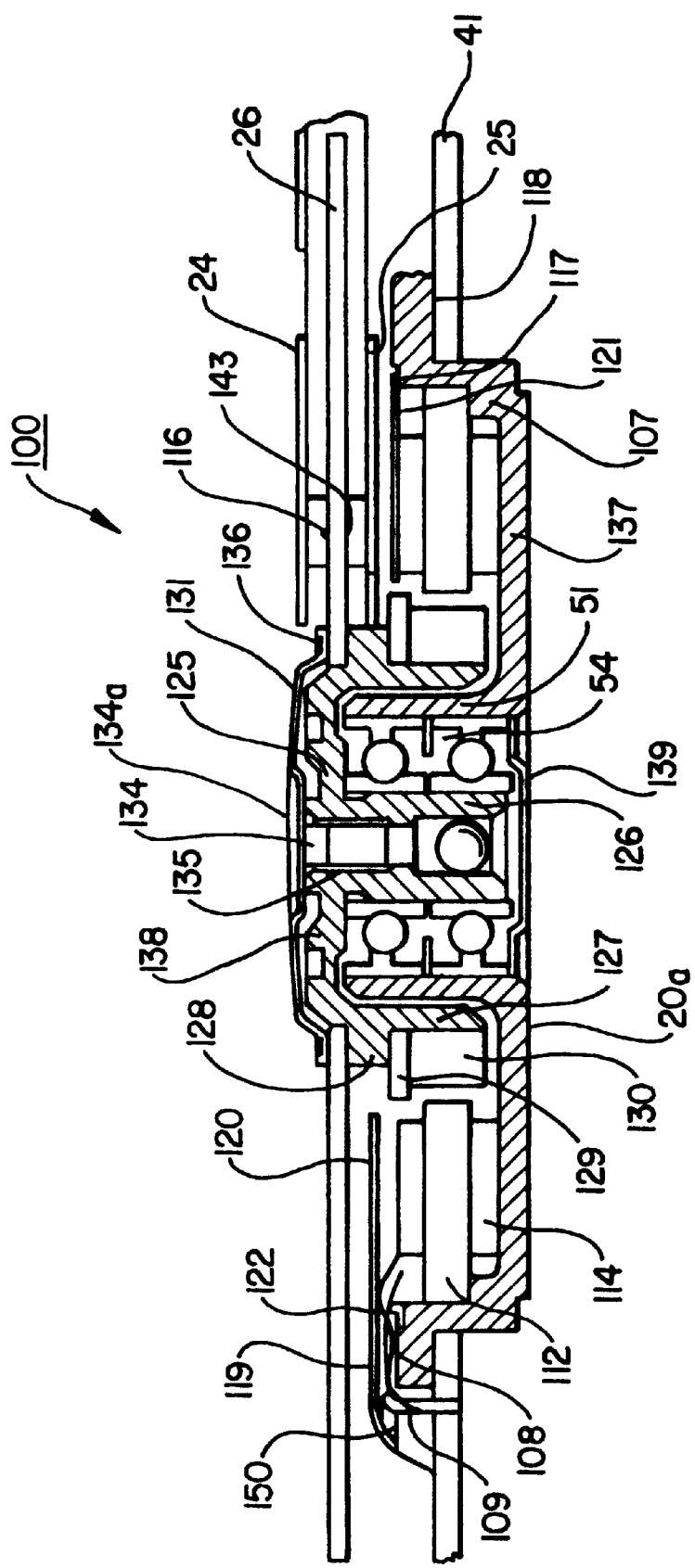
FIG. 5 is a cross sectional view of a spindle motor in an embodiment of the present invention.
Figure 6:
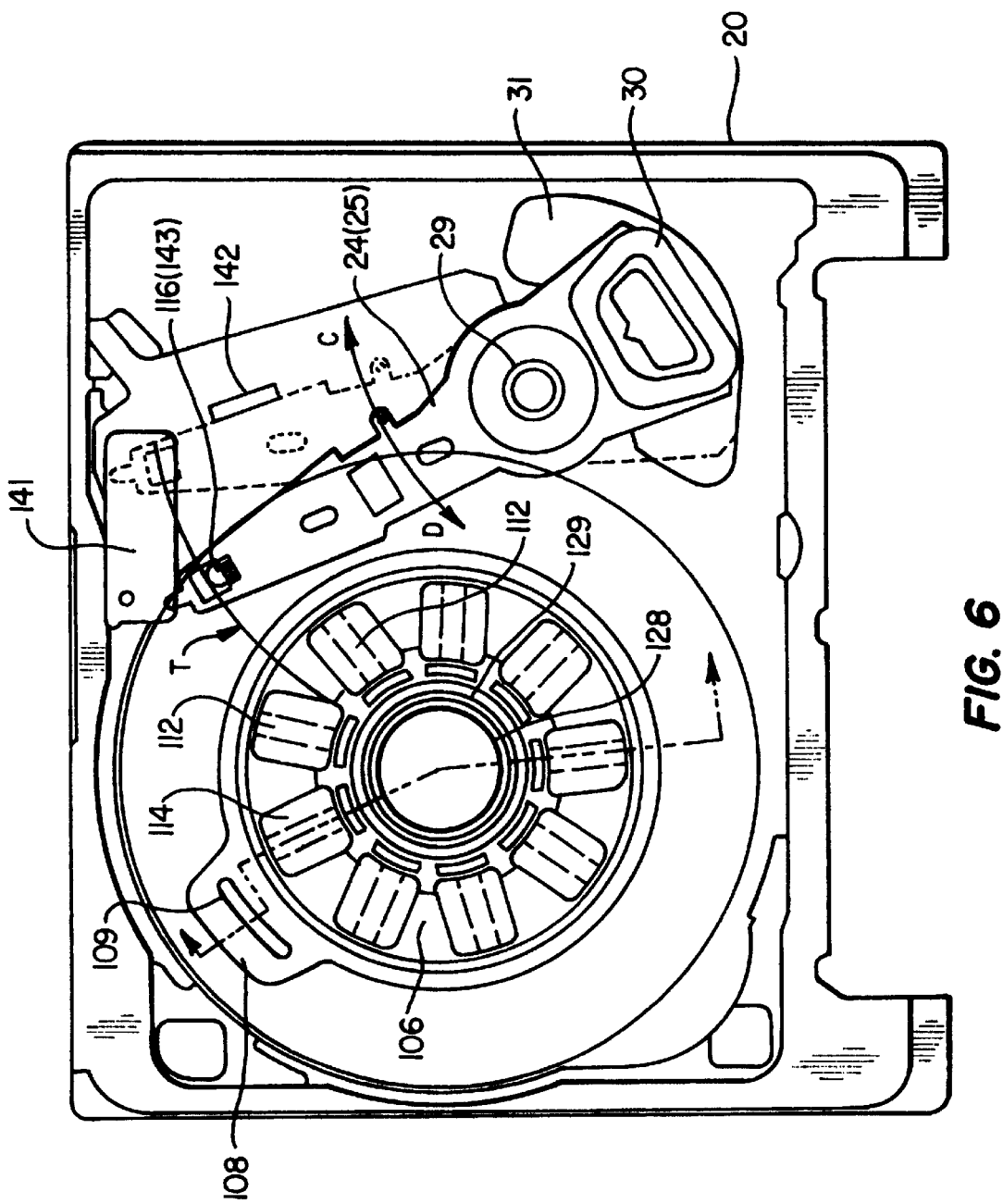
FIG. 6 is a top view of a base provided with an actuator in an embodiment of the present invention.

FIG. 4 is an exploded perspective view of the major portions of both base and spindle motor of the hard disk unit in an embodiment of the present invention. FIG. 5 is partial cross sectional views of both spindle motor and actuator arm. FIG. 6 is a top view of the base to which the actuator is attached.

At the inner periphery of the circular recessed portion 23 formed at the base 20 are formed a first holding step 107 and a second holding step 118. The first holding step 107 enables an outer ring portion 113 of a stator coil unit 106 to be fit therein and the second holding step 118 enables the circumferential portion of the shielding plate 117 to be fit therein.

Another lead recessed portion 108 is also formed at the inner periphery of the circular recessed portion 23. The lead recessed portion 108 is extended outwards at the same height as that of the holding step 118 of the shielding plate 117. A lead hole 109 for passing the lead wire of the stator coil is formed at this lead recessed portion 108 so as to pass through the base 20 vertically.

At the supporting recessed portion 110 is disposed the supporting structure 29 for supporting the actuator arms 24 and 25 described with reference to FIG. 1 rotationally and at the fixed recessed portion 111 is disposed the magnet 31 shown in FIG. 1. The base 20 is formed so that the bottom portion 32 (FIG. 2) formed at the other side of this supporting recessed portion 110 and the circular projection 31 (FIG. 2) formed at the other side of the circular recessed portion 23 are protruded slightly on the bottom as described above.

Concretely, FIG. 1 shows how the magnet 31 and the supporting structure 29 for holding the actuator arms 24 and 25 together rotationally are disposed at this fixed recessed portion 111 and at the supporting recessed portion 110. As described above, the magnet 31 and the coil 30 for rotating the actuator arms 24 and 25 unitarily are disposed so as to face each other (FIG. 6), thereby composing the voice coil motor.

The stator coil unit 106 is formed with a core member composed of a ring-like outer ring portion 113 and the predetermined number (nine in this embodiment) of cores 112 protruded at a predetermined height in the center direction from this ring-like outer ring portion, and coils 114 wound on those protruded cores.

At the tip of each protruded core is formed an arcuate magnetic pole piece 115 formed so that its surface faces and gets closer to the rotor magnet (to be described later) at a wide portion and in uniform.

The stator coil unit 106 composed as described above is fixed so that its outer ring portion 113 is fit in the first holding step 107 formed at the base 20. At this time, the magnetic head 116 (143) is positioned as shown in FIG. 6 so that the tracing of the magnetic head 116 (143) in movement is positioned substantially at a middle portion between two adjacent protruded cores 112 and 112 as shown with a line T in FIG. 6 when the actuator arm 24 (25) is rotated.

As shown in FIG. 5, the actuator arms 24 and 25 are positioned with a disk 26 therebetween and moved unitarily, so the tracing of the moving magnetic head 143 held by the actuator arm 25 is completely the same, as that of the actuator arm 25 as shown in FIG. 6.

And, the shielding plate 117 is fit in the second holding step 118 and fixed there by an adhesive agent so as to cover the stator coil unit 106 held in the circular recessed portion 23 of the base 20 and the protruded portion 119 of the shielding plate 117 covers the lead groove 108 of the base 101.

The shielding plate 117 formed through press working is composed of two stepped portions; a planar portion 121 and an elevated portion 120 from the planar portion 121. As shown in FIG. 5, this portion of the shielding plate is formed as the planar portion 121 and the remaining portion is formed as the elevated portion 120 so that a clearance from the shielding plate 117 is kept enough when the actuator arm 25 rotates on a recording surface of the disk 26. This is also because the lead wire 122 of each coil 114 is guided up to the lead hole 109 formed in the lead groove 108 in a necessary space.

The hub 125 is held at the strut portion 51 of the base 20 via a bearing 54 as shown in FIG. 5. In FIG. 5, s symbol 20a denotes part of the circular recessed portion 23 of the base 20 shown in FIG. 4. The portion 20a composed of a bottom portion 137, a strut portion 51, and a peripheral wall formed by the first and second holding steps forms a base member of the spindle motor 100.

The hub 125 is formed so that its outside portion is substantially like a cup and the center shaft 126 is fit in the center hole 33 (FIG. 4) formed by the strut portion 51 of the base 20a, the inner ring of the bearing 154 is fixed to the center shaft 126, and the outer ring is fixed to the strut portion 51, thereby the hub 125 is held rotationally by the base 20a. Numeral 136 denotes a cover for covering the bottom portion of the center hole 105.

A flange 128 is formed around the top end of the outer peripheral wall portion 127 of this hub 125 and the extreme inner peripheral portion of the disk 26 is placed on this flange 128.

As described above, the hub 125 is composed of the center shaft 126, the outer peripheral wall portion 127, the disk supporting portion, and the joint portion 138 for connecting the center shaft 126 to the outer peripheral wall portion 127 in the upper portion of the strut portion 51 of the base 20a.

On the outer peripheral surface of the outer peripheral wall portion 127 of the hub 125 is fixed a ring-like magnetic shielding member 129 so as to be adjacent to the flange 128. On the same outer peripheral surface are disposed the predetermined number of rotor magnets 130 at equal pitches. The rotor magnets 130 are extended in the radial direction of the disk so that their inner edges come in contact with the outer peripheral wall portion 127 so as to be adjacent to the shielding member 129. Each rotor magnet is magnetized in the radial direction and the rotor magnets are disposed so that an N-pole and an S-pole are alternated in the same direction with respect to the stator coils.

The disk holding spring 131 of the disk 26 is fixed to the hub 125 by the flange 134a of the stopper screw 134 engaged with the female screw 135 formed in the center shaft 126 of the hub 125. At this time, the extreme outer peripheral portion 136 of the holding spring 131 is bent towards the disk surface so as to press the extreme inner peripheral portion of the disk 26. The disk 26 held between the flange 128 and the holding spring 131 is thus rotated unitarily with the hub 125.

A rotor is composed of rotor magnets 130 and a hub 125. A stator is composed of a stator coil unit 106. An inner rotor motor is thus composed so that its rotor is positioned inside the stator.

Figures 9, 10:
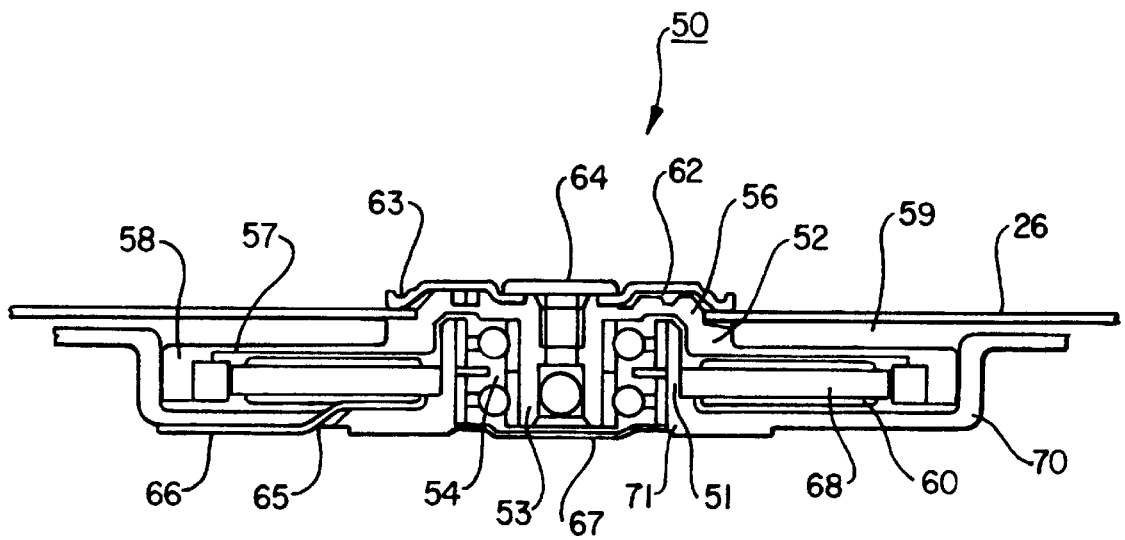
FIG. 9 shows results of the measurement of a leak magnetic flux obtained by disposing a stator coil unit at different positions.
FIG. 10 is a cross sectional view of a configuration of a super-compact spindle motor constructed in accordance with the present invention.
Figure 11:
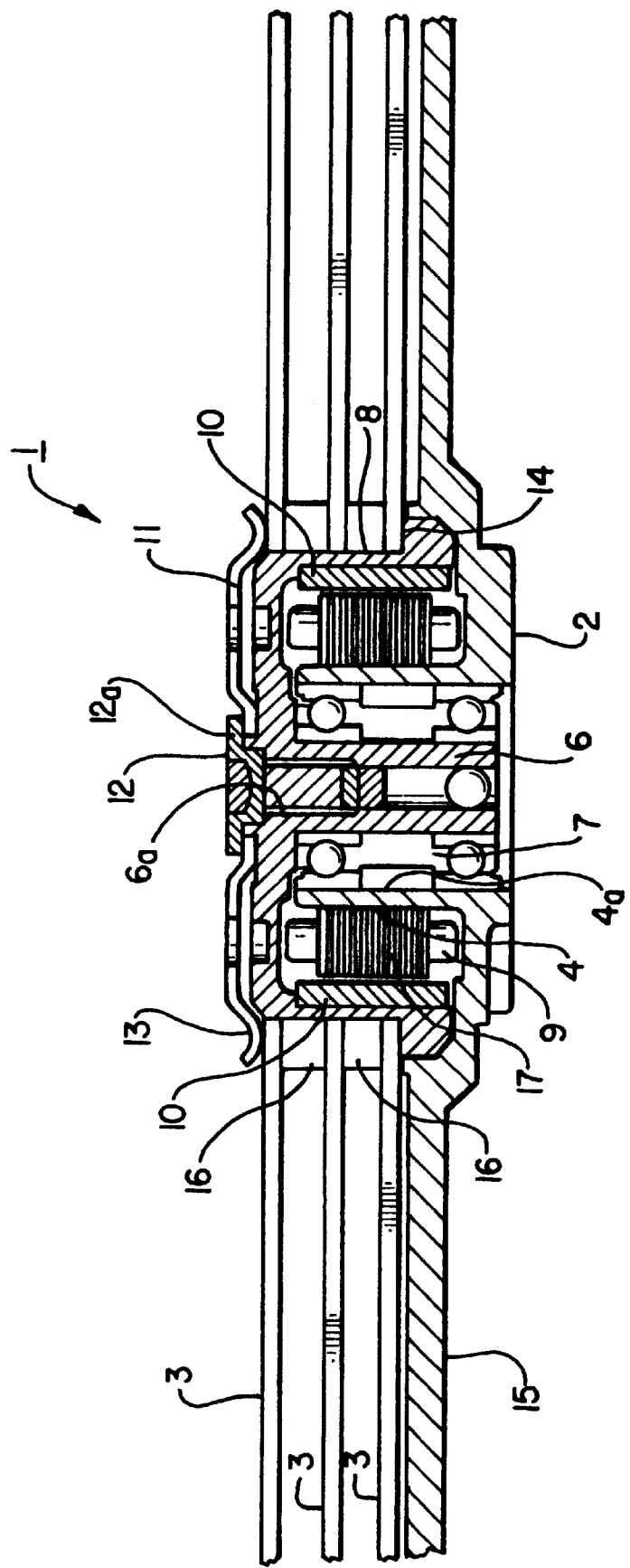
FIG. 11 is a cross sectional view of a configuration of a spindle motor of a conventional 2.5-inch hard disk unit.

Hereunder, the advantages of the inner rotor spindle motor 100 over the outer rotor spindle motor 50 whose cross sectional view is shown in FIG. 10 will be enumerated in the embodiments shown in FIGS. 4 through 6.

1. The inner rotor spindle motor 100 does not have such a portion as the thin planar portion 57 of the hub 52 of the outer rotor spindle motor. This makes it easier to form the hub.
2. The inner rotor spindle motor 100 does not have such a portion as the thin planar portion 57 of the hub 52 of the outer rotor spindle motor. This makes it easier to prevent the imbalance to be caused by the surface vibration of the hub 52 during the rotation of the motor.
3. Because both inertia moment and mass of the hub are reduced, the load to be applied to the bearing is also reduced, thereby the shock resistance is improved. In addition, the steady rotation is achieved quickly and the rotation current during this steady rotation is reduced.
4. The hub 52 does not have a planar portion 57 between the disk and the magnetic circuit, and accordingly, the rotor magnet 130 and the stator coil (a protruded core 112 and a coil 114) can be increased in height (thickness of the disk unit). In addition, a larger space is secured in the radial direction of the disk under a condition for obtaining the same driving power as that of the outer rotor spindle motor. Consequently, the wall of the strut portion 104 of the base 101a can be increased in thickness, thereby improving the rigidity.
5. Because no rotating hub exists in the rotation area of the actuator arm, it is easy to keep a clearance for the rotation of the arm.
6. Because there is no need to lead a wire from the bottom of the base, it is not necessary to make a hole and/or a groove at the bottom of the thin base. Consequently, the strength of the base is secured.
7. Because the materials of the shielding plate 117 and the magnetic shielding member 129 can be selected separately from that of the hub, the shielding is made more effectively.
8. The rotor magnet 130 and the stator coil can be increased in height and reduced in size in the radial direction. Consequently, the circular recessed portion 23 can be reduced in inner diameter and accordingly, the fitting hole 43 formed in the card 41 can be reduced in diameter, thereby the mounting area in the motor can be increased.

And, as shown in FIG. 5, the lead wire 122 is fixed to the base 101a in the lead hole 109 with an adhesive agent 150, and this lead hole 109 is closed by both adhesive agent 150 and lead wire 122.

Consequently, the air flow is not generated easily, since the air path through the motor is closed in such a way even during the rotation of the spindle motor. Foreign matters are thus prevented effectively from entering the motor. The adhesive agent 150 may possibly generate a gas, but the gas is prevented from affecting the recording surfaces of the disk 26 due to the shielding plate 117 covering the adhesive agent 150.

Figure 7:
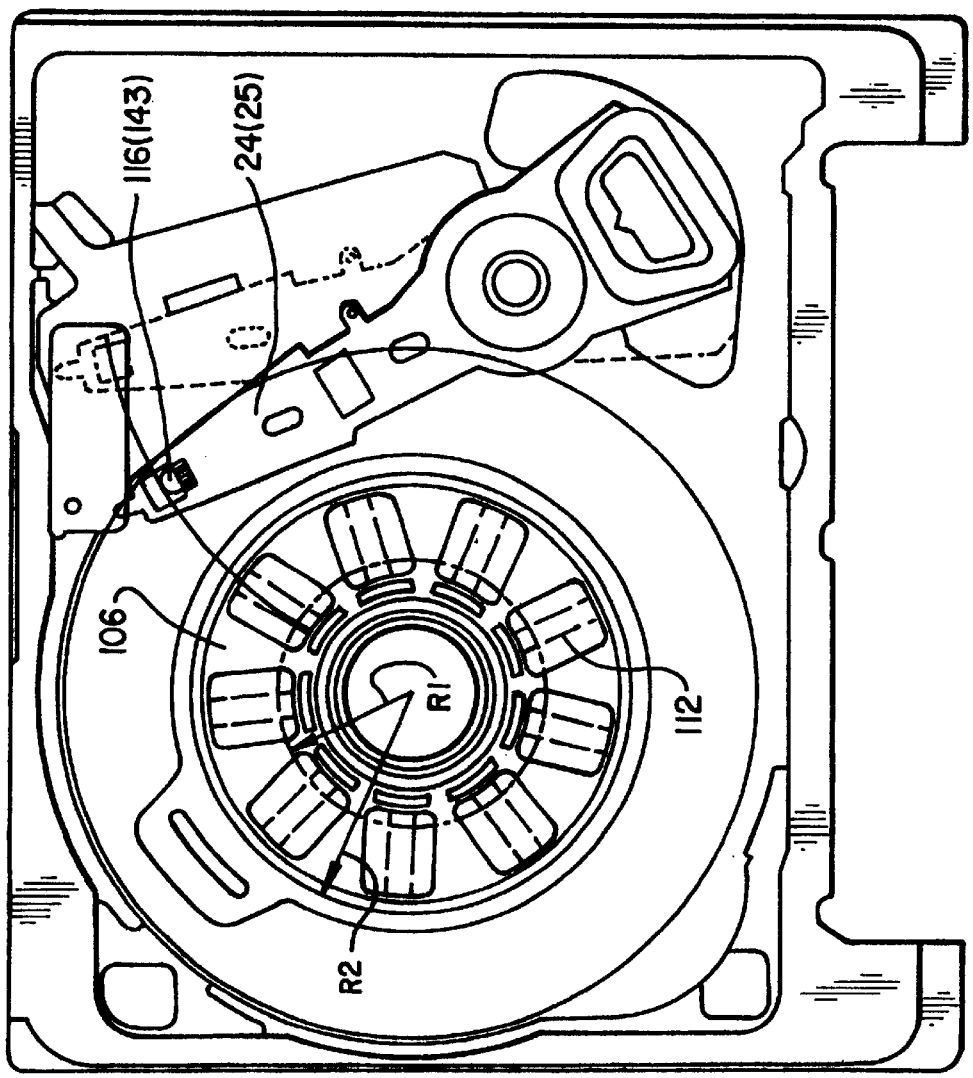
FIG. 7 shows the tracing of a magnetic head in movement.

Next, another feature of this embodiment will be described. As shown with a line T in FIG. 6, in this embodiment, the stator coil unit 106 is disposed so that the tracing of each of the heads 116 and 143 in movement comes substantially to a middle point between the adjacent protruded cores 112 and 112. When the stator coil unit 106 is disposed in such a way, it is found that the leak magnetic flux from the stator coil unit 106 affects the magnetic head 143 less than when the tracing of each of the magnetic heads 116 and 143 in movement comes on the protruded core 112 as shown in FIG. 7. (in FIG. 7, the tracing comes substantially to the center of the protruded core 112). Hereunder, a description will be made of an experimental measurement of the leak magnetic flux.

At first, a predetermined current is applied to each coil 114 so as to rotate the spindle motor, then the leak magnetic flux obtained by the magnetic head 143 closer to the stator coil is measured under each dispositional condition of the stator coil. The shielding plate 117 is removed for this measurement. FIG. 9 shows the result of this measurement.

In FIG. 9, a measuring point denotes a distance from the rotation center of the spindle motor. Measurement is done between a point of R1=6.0 mm around the tip of the protruded core 112 and a point of R2=9.0 mm, which is substantially equivalent to the outer diameter (radius) of the stator coil unit as shown in FIG. 7.

As to be understood clearly from the table, favorable results are obtained when the stator coil unit 106 is disposed so that the tracing of the magnetic head 143 in movement comes substantially to a middle point between two adjacent protruded cores 112 and 112 as shown in FIG. 6.

Next, further another feature of this embodiment will be described. As shown in FIG. 6, the disk unit in this embodiment is a loading/unloading type one. When the disk unit power is off, the actuator arm 24, 25 is moved to the unloading position shown in FIG. 6 with a broken line. Conventionally, a counter electromotive force of the spindle motor is often used for this movement. The counter electromagnetic force is generated when the disk unit power is off.

However, because an inner rotor spindle motor is employed in this embodiment, the inertia is small and the counter electromagnetic power of the spindle motor is not enough to obtain a required energy. Consequently, the following measures are taken to solve such a problem.

In FIG. 6, a lamp 141 is shaped so as to support the tips of a pair of actuator arms 24 and 25 including the magnetic heads 116 and 143 and assure a smooth reciprocating motion of each of the pair of magnetic heads 116 and 143 to/from the disk. The stopper 142 prevents the actuator arms 24 and 25 from rotating outwards from the unloading position.

Figure 8:
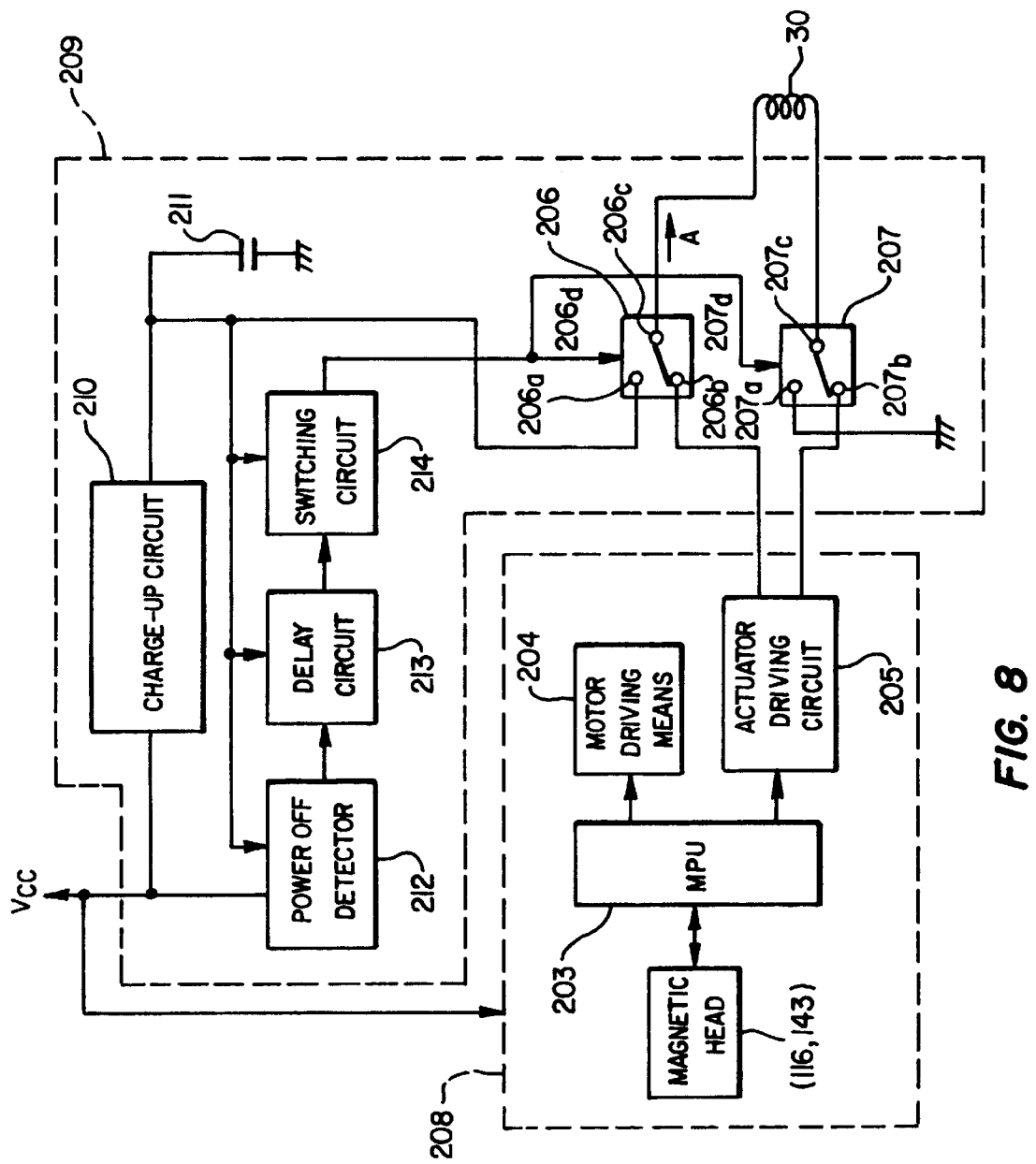
FIG. 8 is a block diagram of an electric system of the whole hard disk unit in an embodiment of the present invention.

FIG. 8 is a block diagram of an electrical system of the whole hard disk unit. A microprocessor unit (hereafter, to be referred to as the MPU) 203 enables the magnetic head 116, 143 to process read and write signals, as well as outputting such command signals as driving, braking, etc. to the motor driving means 204 for controlling the rotation of the spindle motor 100.

The MPU 203 outputs a control signal to the actuator driving circuit 205 so as to move the magnetic head 116, 143 to a predetermined scanning position of the disk 26 according to a signal read by the magnetic head 116, 143 from the disk 26.

The output terminals of the actuator driving circuit 205 are connected to the fixed terminals 206b and 207b of the switches 206 and 207 so as to output a driving current to each coil 30 through the switches 206 and 207.

This coil 30 is combined with a magnet 31 fixed to the base 20 as described above so as to compose a voice coil motor. Both ends of the coil 30 are connected to movable terminals 206c and 207c of the switches 206 and 207. When a current flows in the direction A in FIG. 8, the actuator arm 24, 25 is forced to move in the direction C (FIG. 6). When the current flows in the opposite direction, the actuator arm is forced to move in the direction D (FIG. 8).

A control circuit 208 for those components receives a supply voltage Vcc from external. On the other hand, numeral 209 denotes a lead-in circuit for moving the actuator arm 24, 25 to the unloading position shown in FIG. 6 with a broken line when the power of the hard disk unit is turned off.

A charge-up circuit 210 receiving a supply power Vcc generates a voltage three times as large as this supply voltage Vcc and applies the voltage to the capacitor 211. Consequently, this capacitor 211, soon after receiving a supply voltage Vcc, is charged up to 3×Cp×Vcc if it is assumed that the capacity is Cp and keeps the charged state until the supply voltage Vcc is turned off.

The power off detector 212 keeps monitoring of the supply voltage Vcc. If the Vcc is turned off, the detector 212 outputs a power off detection signal to a delay circuit 213. Receiving the power off detection signal, the delay circuit 213 waits for a predetermined time, then outputs a power off information signal to a switching circuit 214.

The output terminal of this switching circuit 214 is connected to the control signal input terminals 206d and 207d of the switches 206 and 207 so that the circuit 214 outputs a driving signal to each switch when it receives the power off information signal. The driving signal switches the connection between the switches 206 and 207.

The terminal of the capacitor 211 is grounded at one end and connected to the output of the charge-up circuit 210 at the other end. The terminal of the capacitor 211 is also connected to the power inputs of the power off detector 212, the delay circuit 213, the switching circuit 214, and the switch 206, 207 so as to supply a driving power to those components respectively.

Furthermore, the other end of the capacitor 211 is connected to the other fixed terminal 206a of the switch 206 so as to be connected to one end of the coil 30 via the switch 206. The other fixed terminal of the switch 207 is connected to the ground.

Next, the operation of the circuit composed as described above will be described.

While the power of the hard disk unit is on, the output of the switching circuit 214 is inactive, thereby the movable terminal 206c, 207c of the switch 206, 207 selects each fixed terminal 206b, 207b. The switching circuit 214 is thus connected to the terminal.

Consequently, the actuator arm 24, 25 is controlled so as to be positioned at its scanning position according to a command from the MPU and the spindle motor is controlled by the motor driving means so as to obtain a predetermined rotation.

If the power supply is turned off in this state, the output of the switching circuit 214 becomes active at a timing delayed by the delay circuit and switch 206, 207 is changed over. Consequently, each movable terminal 206c, 207c is connected to the corresponding fixed terminal 206a, 207a.

The actuator driving circuit 205 resets the driving voltage to 0 so as to stop the rotation of the actuator arm 24, 25 between when the power is turned off and when each switch is changed over. When the actuator arm 24, 25 stops, the switch 206, 207 is changed over at the above mentioned delayed timing, thereby the capacitor 211 is discharged to the ground via the coil 30 and a current flows in the direction A during this time.

Consequently, the actuator arm 24, 25 is forced to move in the direction C and reaches the unloading position before the capacitor 211 is discharged completely. The capacitor 211 has a capacity for charging an energy enough to move the actuator arm 24, 25 up to the unloading position even when the actuator arm 24, 25 is positioned at the extreme inner periphery of 30 the disk.

The power off detector 212, the delay circuit 213, the switching circuit 214, and the switch 206, 207 of the lead-in circuit 209 must be normal in operation while the actuator arm 24, 25 reaches the unloading position. This is why the terminal voltage of the capacitor 211 is used for each power supply of those components as described above.

The "bottom portion," the "upper portion," and the "lower portion" are used in the description of the above embodiments and the Claims to be described below. They are used just for convenience; they do not describe absolute positional relationships among the components of the disk unit.

INDUSTRIAL APPLICABILITY

The spindle motor of the present invention, therefore, can have a satisfactory driving power, as well as a required rigidity, rotation balance, a shielding effect, etc. even when it is disposed in a limited space, so that the spindle motor will be employed suitably for a thinner-structured disk unit.

Furthermore, according to the disk unit of the present invention, because the tracing of the magnetic head in movement is set at a proper position, the influence of the leak magnetic flux from the stator coil on the head can be reduced satisfactorily.

Furthermore, according to the disk unit of the present invention, the scanning head is moved to the unloading position with use of a charge accumulated in the capacitor when the power is off. It is thus possible to move the scanning head to the unloading position surely even when a super-compact inner rotor spindle motor of a small inertia is installed in the loading/unloading type disk unit.

What is claimed is:

1. A spindle motor employed for a hard disk unit, comprising:
    a base member including a bottom portion, a cylindrical strut portion extended upwards from the bottom portion so as to form a column-like supporting space inside, and a cylindrical peripheral wall formed so as to share a center shaft with the strut portion, the base member forming a circular recessed portion with the peripheral wall and the bottom portion;

a hub including the center shaft fit in the supporting space so as to be supported there rotationally, a joint portion extended outwards in a radial direction of a disk from the center shaft at a position higher than a top end of the strut portion, an outer peripheral wall connected to the joint portion and formed so as to cover the strut portion, and a supporting portion for supporting a hard disk;

a rotor magnet section including a plurality of magnetic poles positioned lower than the supporting portion and disposed on an outer peripheral spice of the outer peripheral wan portion so that an N-pole and an S-pole thereof are alternated in the same direction along the outer peripheral surface;

a plurality of coils wound on a plurality of protruded cores extended toward a rotary shaft from an inner peripheral surface of the circular recessed portion so that tips thereof are adjacent to the rotor magnet section; wherein the spindle motor further includes a supporting portion extended outward in the radial direction of the disk from the outer peripheral wall portion; and a shielding member extended outward in the radial direction of the disk from the outer peripheral wall of the hub between the rotor magnet section and the supporting portion so as to cover the rotor magnet section.

2. A spindle motor employed for a hard disk unit, comprising:

a base member including a bottom portion, a cylindrical strut portion extended upwards from the bottom portion so as to form a column-like supporting space inside, and a cylindrical peripheral wall formed so as to share a center shaft with the strut portion, the base member forming a circular recessed portion with the peripheral wall and the bottom portion;

a hub including the center shaft fit in the supporting space so as to be supported there rotationally, a joint portion extended outwards in a radial direction of a disk from the center shaft at a position higher tan a top end of the strut portion, an outer peripheral wall connected to the joint portion and formed so as to cover the strut portion, and a supporting portion for supporting a hard disk;

a rotor magnet section including a plurality of magnetic poles positioned lower than the supporting portion and disposed on an outer peripheral surface of the outer peripheral wall portion so that an N-pole and an S-pole thereof are alternated in the same direction along the outer peripheral surface;

a plurality of coils wound on a plurality of protruded cores extended toward a rotary shaft from an inner peripheral surface of the circular recessed portion so that tips thereof are adjacent to the rotor magnet section; and wherein the spindle motor fisher includes a ring-like shielding member covering the circular recessed portion so as to cover a plurality of the coils.

3. The spindle motor according to claim 2, wherein a holding step is formed on the inner peripheral surface of the circular recessed portion so that the shielding member is fit in the holding step;

a lead recessed portion continued to the holding step and extended outward in the radial direction of the disk is formed at the base member;

a lead hole is formed at the lead recessed portion so as to pass through the base member; and the shielding member is formed so as to cover a lead groove.

4. The spindle motor according to claim 3, wherein the shielding member has a planar portion and an elevated portion elevated higher than the planar portion so as to cover the lead groove.

5. The spindle motor according to claim 3, wherein a lead wire is fixed to the base member so as to close the lead hole with an adhesive agent at a position where the lead wire passes the lead hole.

* * * * *

UNITED STATES PATENT AND TRADEMARK OFFICE
CERTIFICATE OF CORRECTION

PATENT NO.      : 6,486,578 B2
DATED           : November 26, 2002
INVENTOR(S)     : Kitahori et al.

It is certified that error appears in the above-identified patent and that said Letters Patent is hereby corrected as shown below:

Column 12,
Line 16, please replace the word "fisher" with the word -- further --.

Signed and Sealed this

Ninth Day of September, 2003

JAMES E. ROGAN
*Director of the United States Patent and Trademark Office*